United States Patent [19]

Choi

[11] Patent Number: 5,247,622
[45] Date of Patent: Sep. 21, 1993

[54] ID PROCESSING DEDICATED SCSI BUS INTERFACE LOGIC CIRCUIT

[75] Inventor: Jae B. Choi, Busan, Rep. of Korea

[73] Assignee: Goldstar Co., Ltd., Rep. of Korea

[21] Appl. No.: 724,377

[22] Filed: Jun. 28, 1991

[30] Foreign Application Priority Data

Jun. 30, 1990 [KR] Rep. of Korea ............... 9799/1990

[51] Int. Cl.⁵ .................... G06F 13/00; G06F 13/26
[52] U.S. Cl. .................. 395/325; 395/275;
364/242.92; 364/259.2; 364/259.9; 364/240;
364/238; 364/DIG. 1
[58] Field of Search ........... 395/325, 725, 275, 425;
365/230.02; 340/825.5, 825.51; 370/85.2, 85.6;
371/22.1, 48, 67.1; 364/550; 380/4, 25

[56] References Cited

U.S. PATENT DOCUMENTS

| | | | |
|---|---|---|---|
| 4,237,534 | 12/1980 | Felix | 364/200 |
| 4,402,040 | 8/1983 | Evett | 364/200 |
| 4,467,418 | 8/1984 | Quinquis | 364/200 |
| 4,648,102 | 3/1987 | Riso et al. | 375/106 |
| 4,814,974 | 3/1989 | Narayanan et al. | 364/200 |
| 4,941,086 | 7/1990 | Kriz | 364/200 |
| 4,975,829 | 12/1990 | Clarey et al. | 364/200 |
| 5,072,420 | 12/1991 | Conley et al. | 395/425 |
| 5,081,578 | 1/1992 | Davis | 395/325 |
| 5,083,258 | 1/1992 | Yamasaki | 395/725 |
| 5,083,261 | 1/1992 | Wilkie | 395/725 |

FOREIGN PATENT DOCUMENTS

0150767 7/1985 European Pat. Off. .

*Primary Examiner*—Michael R. Fleming
*Assistant Examiner*—Gopal C. Ray
*Attorney, Agent, or Firm*—Ostrolenk, Faber, Gerb & Soffen

[57] ABSTRACT

An ID processing dedicated SCSI bus interface logic circuit comprising a self ID decoder for decoding a self ID input; a priority encoder for encoding the highest priority ID on a SBI data bus; an ID Win comparator for comparing the self ID input with an output from said priority encoder to generate an ID win signal; a multiplexer for multiplexing the output from the priority encoder and a target ID input; a target ID decoder for decoding an output from the multiplexer; an NOR gate for NORing outputs from the self ID decoder 11 and from the target ID decoder every bit; a driver for arbitrating an output from the NOR gate to the SBI data bus; an IDOK comparator for comparing the output from the NOR gate with the ID on the SBI data bus to generate a signal IDOK; and a latch for latching the output from the priority encoder in response to an ID latch clock from a host computer to output a target ID selection signal. According to the present invention, the ID processing dedicated SCSI bus interface logic circuit can perform an identification processing and an error detection, with respect to IDs, by comparing the highest priority ID data on the SBI bus with a different ID data in arbitration on a bus between the host computer and target devices.

1 Claim, 2 Drawing Sheets

ID PROCESSING DEDICATED SCSI BUS INTERFACE LOGIC CIRCUIT

BACKGROUND OF THE INVENTION

The present invention relates in general to an interface logic circuit for a small computer system interface (SCSI), and more particularly to an identification (ID) processing dedicated SCSI bus interface logic circuit for performing identification processing and error detection, with respect to IDs, by comparing the highest priority ID with a different ID on a bus between a host computer and target devices.

Generally, an SCSI interface is used for a peripheral LSI of a microcomputer for co-operating with a SCSI controller to perform on a bus between a host computer and target devices, or auxiliary storages, such as, for example, a floppy disk, a hard disk, an optical disk and etc., processings of a direct memory access (DMA) or an input/output access by a program, or an interrupt for a CPU, control of transmission processing of data being transferred to the bus and the like.

Referring to FIG. 1, there is shown a block diagram of a conventional SCSI interface chip (IC) of the type as mentioned above. The conventional SCSI interface chip disclosed herein is an IC, Model NCR 5380 available from NCR Co., Ltd. The SCSI IC is connected between a host computer CPU interface (HCI) and a SCSI bus also connected to target devices (not shown). Also, the SCSI IC comprises registers for storing temporarily a variety of information, a DMA control logic, a parity check logic, a bus phase comparison logic, an ID comparison logic, etc.

A SCSI bus interface, referred to hereinafter as a SBI, is connected between the SCSI IC and the target devices and is an IC customized usually according to a usage, function options, etc. of the micro computer. The SBI of the type as above-mentioned is an IC, for example, Model MB 89352 available from FUJITSU, Co, Ltd. or Model UPD 9309 GF available from NEC Co., Ltd..

SUMMARY OF THE INVENTION

Therefore, it is an object of the present invention to provide an ID processing dedicated SCSI bus interface logic circuit for performing identification processing and error detection, with respect to IDs, among auxiliary storages such as a floppy disk, a hard disk, an optical disk, etc. and for establishing readily an SCSI controller IC in connection with an existing SCSI control logic and an existing DMA logic.

It is another object of the present invention to provide an ID processing dedicated SCSI bus interface logic circuit for performing identification processing an error detection, with respect to IDs, by comparing the highest priority ID data on an SBI bus with a different ID data in arbitration on a bus between a host computer and target devices.

In accordance with the present invention, these objects can be accomplished by providing an ID processing dedicated SCSI bus interface logic circuit comprising: self ID decoding means for decoding a self ID input; priority encoding means for encoding the highest priority ID on an SBI data bus; ID Win comparing means for comparing said self ID input with an output from said priority encoding means to generate an ID win signal; multiplexing means for multiplexing said output from said priority encoding means and a target ID input; target ID decoding means for decoding an output from said multiplexing means; NOR gate means for NORing outputs from said self ID decoding means and from said target ID decoding means every bit; driver means for arbitrating an output from said NOR gate means to said SBI data bus; IDOK comparing means for comparing said output from said NOR gate means with said ID on said SBI data bus to generate a predetermined signal; and latching means for latching said output from said priority encoding means in response to an ID latch clock from a host computer to output a target ID selection signal.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF PREFERRED EMBODIMENTS

Figure 1:
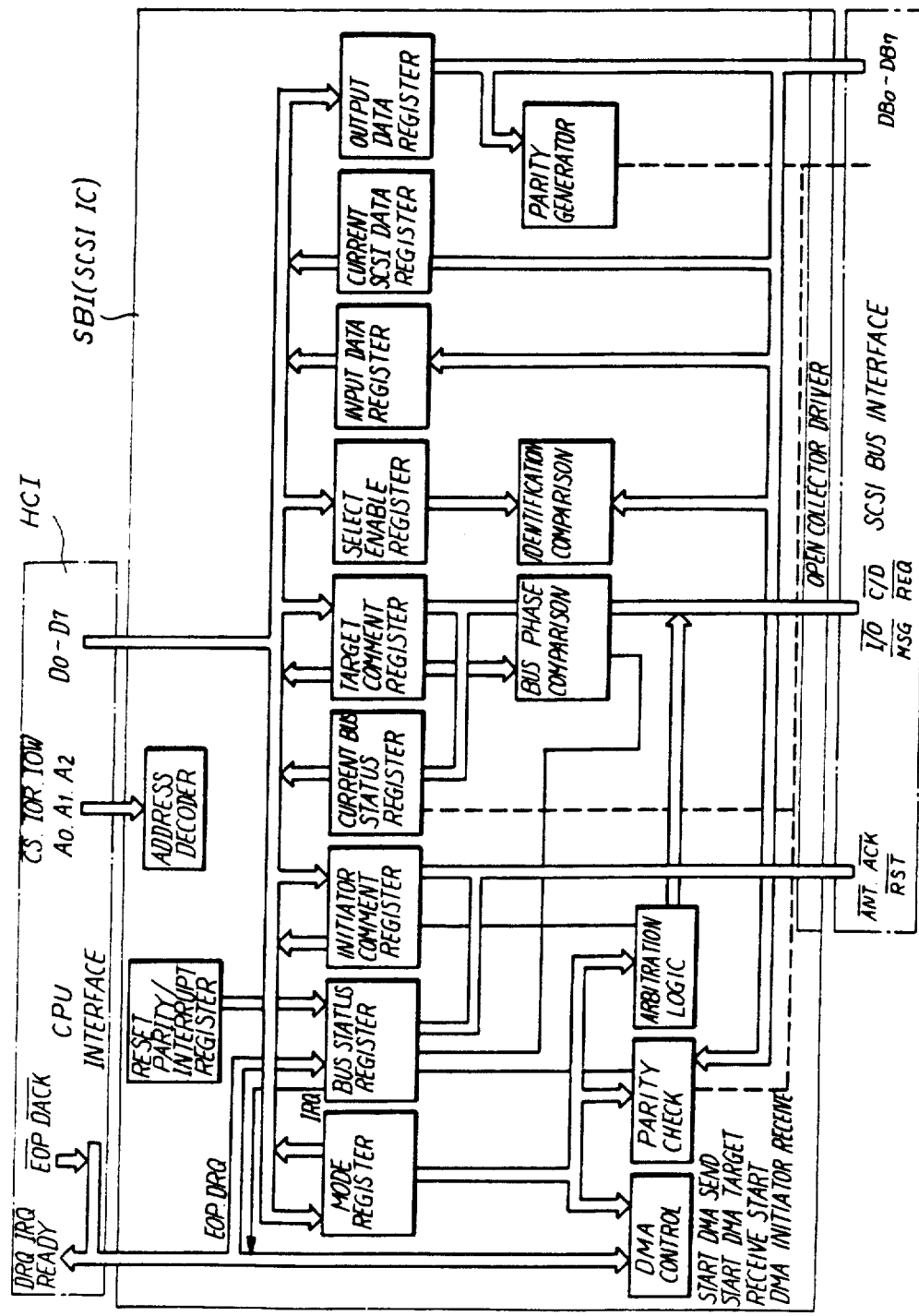
FIG. 1 is a block diagram of a conventional SCSI interface chip.
Figure 2:
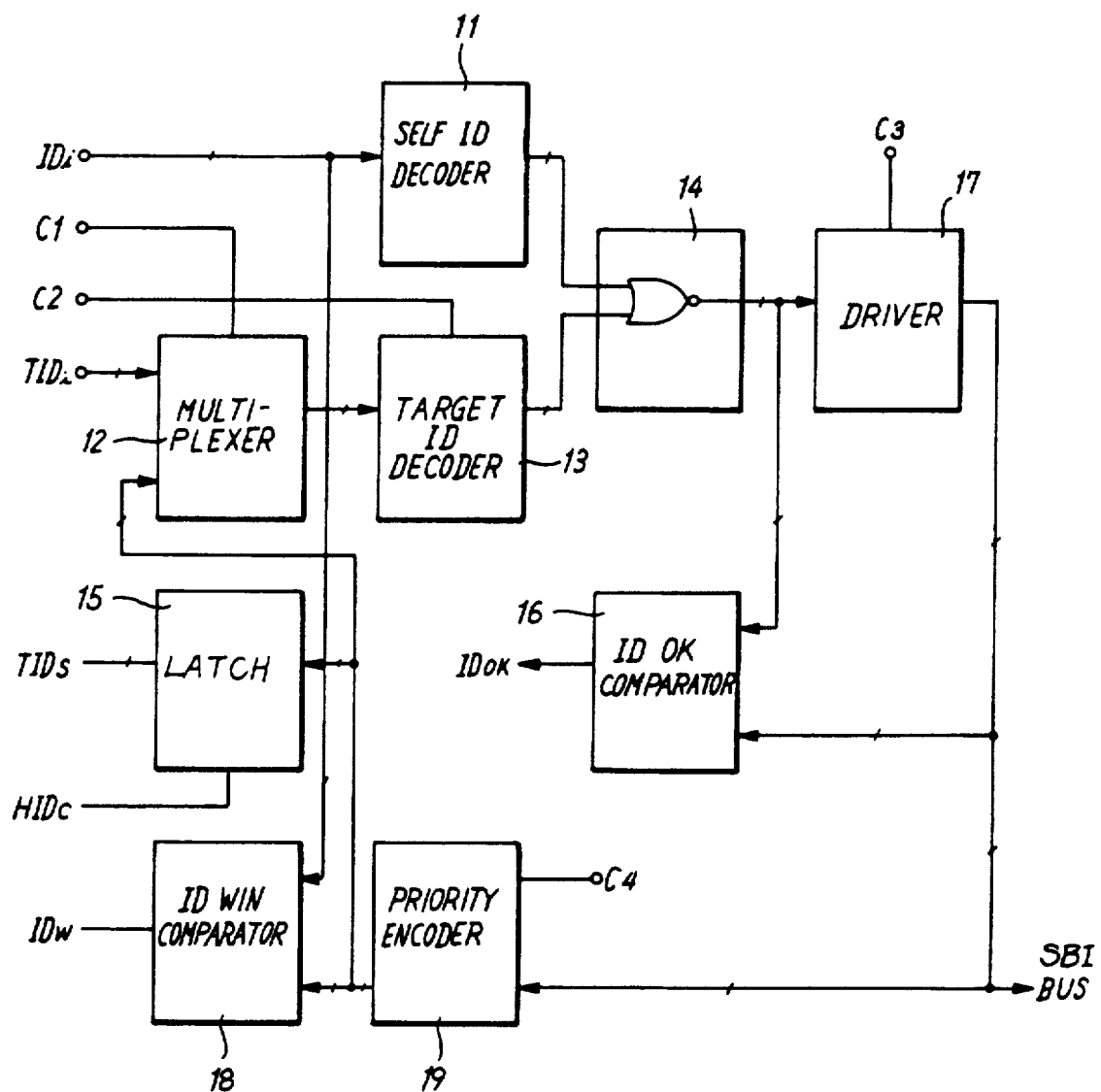
FIG. 2 is a block diagram of an ID processing dedicated SCSI bus interface logic circuit of the present invention.

Referring to FIG. 2, there is shown a block diagram of an ID processing dedicated SCSI bus interface logic circuit of the present invention. In this drawing, the ID processing dedicated SCSI bus interface logic circuit of the present invention is shown to comprise a 3×8 self ID decoder 11 for decoding 3 bits self ID input IDi to output 8 bits data, an 8×3 priority encoder 19 for encoding priority data of 8 bits data on an SBI data bus to output 3 bits data, a multiplexer 12 for multiplexing the 3 bits output data from the 8×3 priority encoder 19 and 3 bits target ID input TIDi, a target ID decoder 13 for decoding output from the multiplexer 12 to output 8 bits data, a NOR gate 14 for NORing the 8 bits output data from the 3×8 self ID decoder 11 and the 8 bits output data from the target ID decoder 13 every bit, a driver 17 for arbitrating self ID and ID to be selected, i.e., output from the NOR gate 14 to the SBI data bus, an IDOK comparator 16 for comparing the output from the NOR gate 14 with data on the SBI data bus to output a signal IDOK, an ID Win comparator 18 for comparing the 3 bits self ID input IDi with the 3 bits output data from the 8×3 priority encoder 19 to output an ID win signal IDw, and a latch IE 15 for latching the 3 bits output data from the 8×3 priority encoder 19 in response to an ID latch clock HIDc from a host computer to output a target ID selection signal TIDs.

The operation of the ID processing dedicated SCSI bus interface logic circuit with the construction as mentioned above in accordance with the present invention will now be described in detail.

In the process related to the ID in the SCSI interface system, there are included an arbitration operation, a selection and reselection operation and a selection and reselection response operation.

In the arbitration operation related to the ID in the SCSI interface system as stated above, the ID processing dedicated SCSI bus interface logic circuit of the present invention performs the operation as follows.

First, upon receiving the 3 bits self ID input IDi, the self ID decoder 11 decodes the 3 bits self ID input IDi and outputs 8 bits data. Then, this 8 bits output data from the self ID decoder 11 are sent out on the SBI data bus via the NOR gate 14 and the open collector driver 17 being enabled by a control signal C3. At this time, the SCSI controller applies a control signal C2 disabling the target ID decoder 13, thereby leaving the target ID decoder 13 to be maintained at its disable state.

Thereafter, upon receiving the highest priority 8 bits ID on the SBI data bus, the priority encoder 19 encodes the highest priority 8 bits ID and outputs 3 bits data. Then, this 3 bits output data from the priority encoder 19 is applied to the ID win comparator 18, together with the 3 bits self ID input IDi. Upon receiving the 3 bits output data from the priority encoder 19 and the 3 bits self ID input IDi, the ID Win comparator 18 compares them with each other. If the 3 bits output data from the priority encoder 19 and the 3 bits self ID input IDi are the same, the ID Win comparator 18 outputs the ID win signal IDw and the ID processing dedicated SCSI bus interface logic circuit recognizes that the self ID is the highest priority ID and hence performs the arbitration operation processing related to the ID.

On the other hand, in the selection and reselection operation, the 3 bits target ID input TIDi is selected and outputted by the multiplexer 12 in response to a control signal C1. As the target ID decoder 13 is enabled by the control signal C2, it decodes the output from the multiplexer 12 and outputs 8 bits data.

Thereafter, the NOR gate 14 NORs the 8 bits output data from the self ID decoder 11 and the 8 bits output data from the target ID decoder 13. This NORed output from the NOR gate 14 is sent out to the SBI data bus via the driver 17 in response to the control signal C3. As a result, the self ID and the ID to be selected are sent to the SBI data bus.

Also, in selection and reselection response operation the 3 bits data of 8 bits data on the SBI data bus passed through the priority encoder 19 are inputted to the target ID decoder 13 via the multiplexer 12, the priority encoder 19 controlling higher and lower priority of data according to whether the system is host or target, in response to a control signal C4. Thus, the 8 bits output data from the target ID decoder 13 are NORed with the 8 bits output data from the self ID decoder 11 by the NOR gate 14, in other words, the self ID and the ID having priority are summed. Then, the IDOK comparator 16 compares the NORed output from the NOR gate 14 with the data on the SBI data bus. If the NORed output from the NOR gate 14 and the data on the SBI data bus are in accord with each other, the IDOK comparator 16 outputs the signal IDOK. At this time, the driver 17 is at its disable state.

On the other hand, when the data value compared by the IDOK comparator 16 is true, in the ID data on the SBI data bus, there are present only 2 IDs involving the self ID and hence an ID error can be checked. At this time, the ID data can be recognized that itself has been called by other system.

Also, the host ID can be recognized through the host ID latch clock HIDc.

Now, the operation of the ID processing dedicated SCSI bus interface logic circuit of the present invention in the selection response will be described in more detail.

Assuming that the ID data sent from the target device in the normal selection response when 2 bits of the target ID BID and the self ID AID are all logic 0 and all normal are represented as the following bit format (1).

$$\underset{\underset{AID}{|}}{1}0 1 1 1 1 \underset{\underset{BID}{|}}{0} 1 B \qquad (1)$$

these IDs all are received by the A part, then passed through the priority encoder 19 and hence bits of only 0 0 1 B corresponding to the ID of the B part are produced. These bits pass through the multiplexer 12 and the target ID decoder 13 and hence there are produced bits of the following format (2).

$$0 0 0 0 0 0 1 0 B \qquad (2)$$

On the other hand, if the self ID decoder 11 decodes bits 1 1 0 B, there are produced bits of the following format (3).

$$0 1 0 0 0 0 0 0 B \qquad (3)$$

If these bits of the two formats are NORed by the NOR gate 14, there are produced bits of the following format (4).

$$(2)+(3)\rightarrow 1 0 1 1 1 1 0 1 B \qquad (4)$$

Then, the IDOK comparator 16 compares bits of the format (1) with bits of the format (4). If the bits are in accord with each other, the IDOK comparator 16 outputs the signal IDOK. Therefore, the ID data can be recognized with no error that itself has been selected by the system.

At this time, in case that a bit corresponding to the self ID AID is not logic 0 in the B part, or two or more IDs are logic 0 due to various errors, the bit formats (4) and (1) are not equal to each other, thereby causing the signal IDOK not to be generated from the IDOK comparator 16.

Also, if the 3 bits output data from the priority encoder 19 is latched by the latch IE 15 when the signal IDOK is generated from the IDOK comparator 16, the ID of the target device selecting itself can be recognized.

As hereinbefore described, in accordance with the present invention, there is provided the ID processing dedicated SCSI bus interface logic circuit being novel and simple in that the SBI of the SCSI system connecting the host computer to target devices, or auxiliary storages, such as, for example, a floppy disk, a hard disk, an optical disk, etc. performs all processings with respect to IDs and an ID error detection as well. Therefore, the ID processing dedicated SCSI bus interface logic circuit according to the present invention can establish readily a SCSI controller in connection with an existing SCSI control logic and an existing DMA logic.

Although the preferred embodiments of the invention have been disclosed for illustrative purpose, those skilled in the art will appreciate that various modifications, additions and substitutions are possible, without departing from the scope and spirit of the invention as disclosed in the accompanying claims.

What is claimed is:

1. An ID processing dedicated SCSI bus interface logic circuit comprising:
    self ID decoding means for decoding a self ID input;
    priority encoding means for encoding the highest priority ID on an SBI data bus;

ID Win comparing means for comparing said self ID input with an output from said priority encoding means to generate an ID win signal;

multiplexing means for multiplexing said output from said priority encoding means and a target ID input;

target ID decoding means for decoding an output from said multiplexing means;

NOR gate means for NORing outputs from said self ID decoding means and from said target ID decoding means every bit;

driver means for transferring an output from said NOR gate means to said SBI data bus;

IDOK comparing means for comparing said output from said NOR gate means with said ID on said SBI data bus to generate a predetermined signal; and latching means for latching said output from said priority encoding means in response to an ID latch clock from a host computer to output a target ID signal.

* * * * *